United States Patent [19]
DeBell et al.

[11] 3,968,520
[45] July 6, 1976

[54] AUTOMATIC CONTROL CIRCUITRY FOR TAPE TRANSDUCING APPARATUS

[75] Inventors: Lawrence R. DeBell, Bethany; David D. Price, Jr., Oklahoma City, both of Okla.

[73] Assignees: The Economy Company; David D. Price, Jr.; Ford C. Price, all of Oklahoma City, Okla. ; part interest to each

[22] Filed: Mar. 28, 1975

[21] Appl. No.: 563,136

[52] U.S. Cl.................................... 360/71; 360/78; 360/106
[51] Int. Cl.² .................. G11B 5/55; G11B 15/18; G11B 21/08
[58] Field of Search ....................... 360/71, 74–75, 360/78, 105, 106; 179/100.1 PS, 100.1 S, 100.1 VC

[56] References Cited
UNITED STATES PATENTS

| | | |
|---|---|---|
| 3,347,996 | 10/1967 | Uchikoshi ............................ 360/71 |
| 3,405,461 | 10/1968 | Joslow .................................. 360/74 |
| 3,730,532 | 5/1973 | Miyamoto ............................ 360/75 |
| 3,918,086 | 11/1975 | Blackie et al. ......................... 360/55 |

Primary Examiner—Alfred H. Eddleman
Attorney, Agent, or Firm—Laney, Dougherty, Hessin & Fish

[57] ABSTRACT

Control circuitry for use with tape transducing apparatus which enables increased versatility of tape playback functions. The apparatus has the capability of automatic tape rewind, message recycle, endless message repeat, and other automatic functions valuable in playback of certain forms of music, advertising and the like. A tape motion sense circuit functions in response to sensing of tape drive motor supply voltage to monitor tape forward and rewind conditions for coactive operation with such as tape record control tone information, end of tape and other condition enablement to further control transducer head positioning.

13 Claims, 8 Drawing Figures

AUTOMATIC CONTROL CIRCUITRY FOR TAPE TRANSDUCING APPARATUS

CROSS-REFERENCE TO RELATED APPLICATIONS

The subject matter of the present invention is related to the invention disclosed and claimed in U.S. patent application Ser. No. 340,706 filed on Mar. 13, 1973 and entitled "IMPROVEMENTS IN CIRCUITRY FOR RECORD APPARATUS", now U.S. Pat. No. 3,879,756; and the specific mechanical apparatus is disclosed and claimed in U.S. Pat. No. 3,833,922 as issued on Sept. 3, 1974 and entitled "DRIVE MEANS FOR EFFECTING PIVOTAL VERTICAL MOVEMENT OF A TRANSDUCER HEAD INTO OPERATIVE POSITION".

BACKGROUND OF THE INVENTION

1. Field of the Invention

The invention relates generally to record transport control and automatic control circuitry and, more particularly, but not by way of limitation, it relates to improvements in record tape playback apparatus having increased automatic control capabilities.

2. Description of the Prior Art

Applicants know of no prior art which is specifically directed to automatic control circuitry for tape transport apparatus that functions in response to tape motion and condition as sensed in the manner set forth herein. While it has been well known in the past to institute various automatic functions in response to recorded tone and other extra structural influence, it has not been within the prior art to enable total automatic playback control, including transducer head positioning, by utilizing structure, circuitry and interactive function such as set forth in the present application.

SUMMARY OF THE INVENTION

The present invention contemplates improvements in automatic control circuitry for record playback apparatus wherein total playback and rewind operation as well as transducer head positioning control may be effected in any of several modes of operation. In a more limited aspect, the invention consists of tape forward drive and rewind motors which function to further control playback and rewind functions in concert with transducer head positioning through any of several operational modes which may be controlled through recorded tone, front panel activation, tape fault activation, end of tape activation, and the like.

Therefore, it is one object of the present invention to provide a tape playback apparatus which is capable of totally automatic operation without intervention of the human operator after initial enablement.

It is also an object of the invention to provide automatic control circuitry for record apparatus which enables a wide variety of sound reproduction uses in various specific fields of endeavor.

It is yet another object of the present invention to provide automatic control circuitry which is versatile yet reliable while being of relatively low cost in manufacture.

Finally, it is an object of the present invention to provide a low cost, high reliability automatic tape transducing apparatus of quality construction having vastly improved versatility of operation.

Other objects and advantages of the invention will be evident from the following detailed description when read in conjunction with the accompanying drawings which illustrate the invention.

BRIEF DESCRIPTION OF THE DRAWINGS

FIGS. 4 and 5 are a schematic diagram of the control circuit of the present invention;

DETAILED DESCRIPTION OF THE INVENTION

Figure 1:
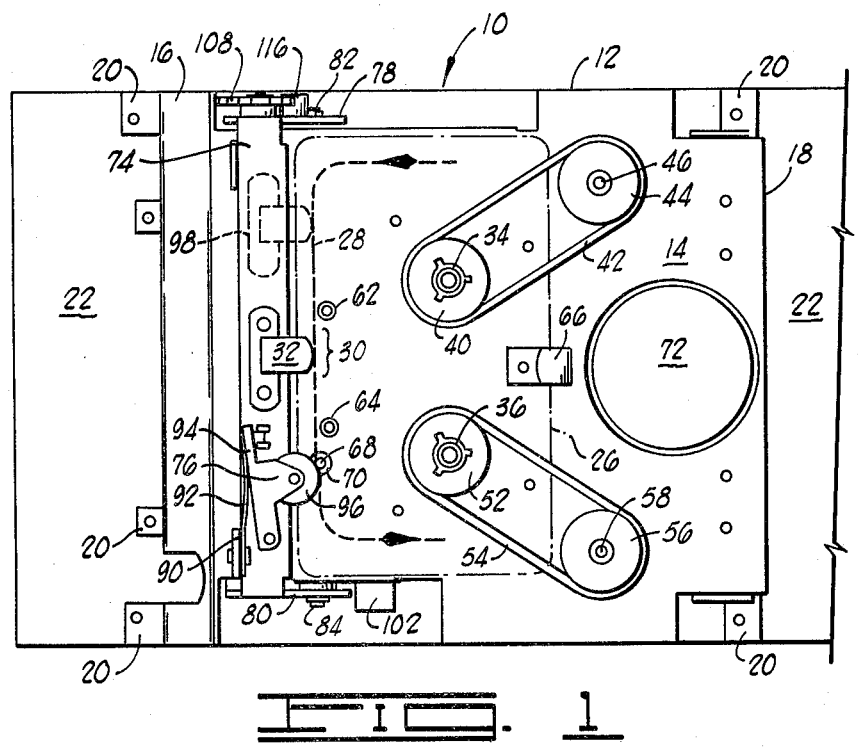
FIG. 1 is a top plan view of a tape transport constructed in accordance with the present invention.
Figure 2:
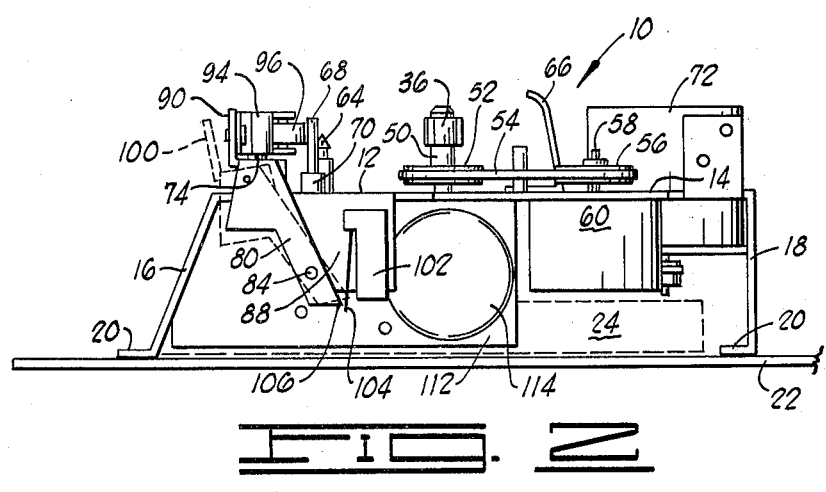
FIG. 2 is a side elevation of one side of the tape transport of FIG. 1.
Figure 3:
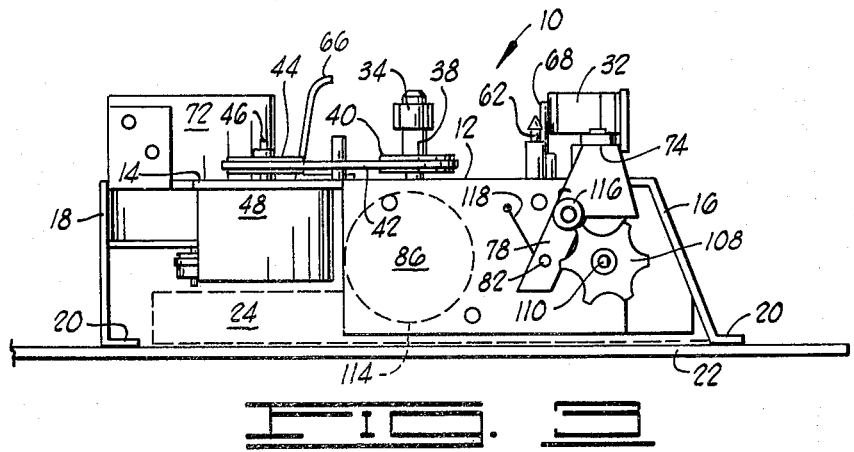
FIG. 3 is a side elevation of the opposite side of the tape transport of FIG. 1.

The transport apparatus of FIGS. 1, 2 and 3, as well as the coactive audio circuits, are the particular subject matter of the aforementioned U.S. Patent and pending U.S. Application, but are briefly described again herein to provide unity of disclosure. A tape transport 10 consists of a support structure or chassis 12 which is formed as a planar top surface 14, a slanted front surface 16 and a rear surface 18. Plural attaching flanges 20 are then directly connectable to a circuit board base 22. The circuit board base 22 provides multiple function as a printed circuit board for associated electronic components (See dash-line area 24), as a base panel unit, and it includes integral contact circuitry for coaction with front panel switch elements.

Tape transport 10 is adapted to receive a standard form of magnetic tape cassette as shown by dash-line 26 in FIG. 1. The cassette 26 includes conventional internal reel and pulley structure whereby magnetic tape 28 may be continually moved past a fixed position, indicated generally by bracket 30, whereat contact is made with a transducer head 32. Rotary drive to cassette 26 is supplied by independently driven tape drive spurs 34 and 36 which fit into engagement with the respective drive sprockets of tape cassette 26. The tape supply drive spur 34 is supported on a shaft 38 (See FIG. 3) extending axially upward from a drive pulley 40. The drive pulley 40 receives rotation from a drive belt 42 which, in turn, is moved by a drive pulley 44 secured to an output shaft 46 of a supply drive motor 48 which is secured to the underside of chassis top surface 14.

Similar structure is employed for the take-up function (See FIG. 2) as take-up drive spur 46 is secured on shaft 50 and drive pulley 52 to receive rotary motion via drive belt 54 from an output drive pulley 56. The output drive pulley 56 is secured to motor shaft 58 of a take-up motor 60. Supply motor 48 and take-up motor 60 are presently designated as commercially available D-C motors, e.g. type No. MHN-5LB3 as manufactured by Matsushita Industrial Electric Company, Ltd. of Tokyo, Japan.

The cassette 26 is received in operative placement with the aid of standard-spaced guide pins 62 and 64 as suitably secured on top surface 14, and a spring clip 66 provides captive retention of the rear edge of cassette 26. A drive capstan 68 is rotatably retained in a bushing 70 secured through chassis top surface 14; and, therebelow, the lower shaft end of capstan 68 is secured through mechanical linkage to receive rotational drive from a capstan drive motor 72. The capstan drive linkage is a pulley-belt transmission, and the precise structure is more particularly set forth in the aforementioned related U.S. Pat. No. 3,833,922. As the invention is presently constructed, capstan drive motor 72, including speed regulator, may be such as a type MHI-5L6C, also commercially available from Matsushita Industrial Electric Company, Ltd.

A control bar 74 carries the transducer head 32 and a capstan idler 76, and serves the function of controllably moving associated components into and out of operative position relative to tape cassette 26 and fixed position 30. The control bar 74 is formed to include right-angle extending pivot arms 78 and 80 from opposite ends thereof, pivot arms 78 and 80 then each being pivotally affixed at pivot posts 82 and 84 as secured to respective flange brackets 86 and 88.

A flange 90 formed vertically from control bar 74 has one end of a flat spring 92 secured thereto with the opposite end of spring 92 urging against a pivotally secured pulley yoke 94 carrying capstan idler pulley 96 in position to urge idler pulley 96 against drive capstan 68 when in operative position. The transducer head 32 is suitably affixed directly on top of control bar 74 as by screw fasteners or the like, and modifications of the transport may include additional heads such as a recording transducer head, as shown by dash-lines 98.

FIGS. 1, 2 and 3 each show control bar 74 in the engaged or operative position; however, the opposite or disengaged control bar position is shown by dash-lines 100 in FIG. 2. An engage switch 102 is secured on flange bracket 88 to extend a microswitch feeler contact 104 in actuating position relative to an actuating corner 106 of pivot arm 80. The engage switch 102 is connected normal open (N.O.) when control bar 74 is disengaged, and will conduct normal closed (NC) when control bar 74 is in the operative position with feeler contact 104 relaxed. The engage switch 102 and associated circuits will be further described below.

Pivotal actuation of control bar 74 is effected by means of a star wheel 108 as driven by a rotary output shaft 110 from a gear train linkage (not specifically shown) within a housing 112 and receiving rotational input from a head engage motor 114. Any of various conventional rotational reduction mechanisms may be utilized in order to obtain the desired rotation reduction ratio.

A cam follower 116, a roller or post, is secured on pivot arm 78 in coactive position with star wheel 108 such that movement of the star wheel and positioning of cam roller 116 at the outer star wheel diameter will place control bar 74 in the engaged position. Movement of cam roller 116 down into the lands or inner diameter of star wheel 108 will then allow the control bar 74 to move to the disengage position. A wire spring 118 is secured to lead down beneath pivot post 82 and upward into hook engagement over the edge of pivot arm 78, and serves to urge control bar 74 toward the disengage position as permitted by star wheel 108.

The engage motor 114 may be such as commercially available motor of type MHN-5LB3 as manufactured by Matsushita Industrial Electric Company, Ltd.; however, generally satisfactory operation has been accomplished utilizing a commercially available motor/speed reducer combination such as the type MSG-F15, which is manufactured by Meguro Seiki Company, Ltd. of Tokyo, Japan.

Figure 4:
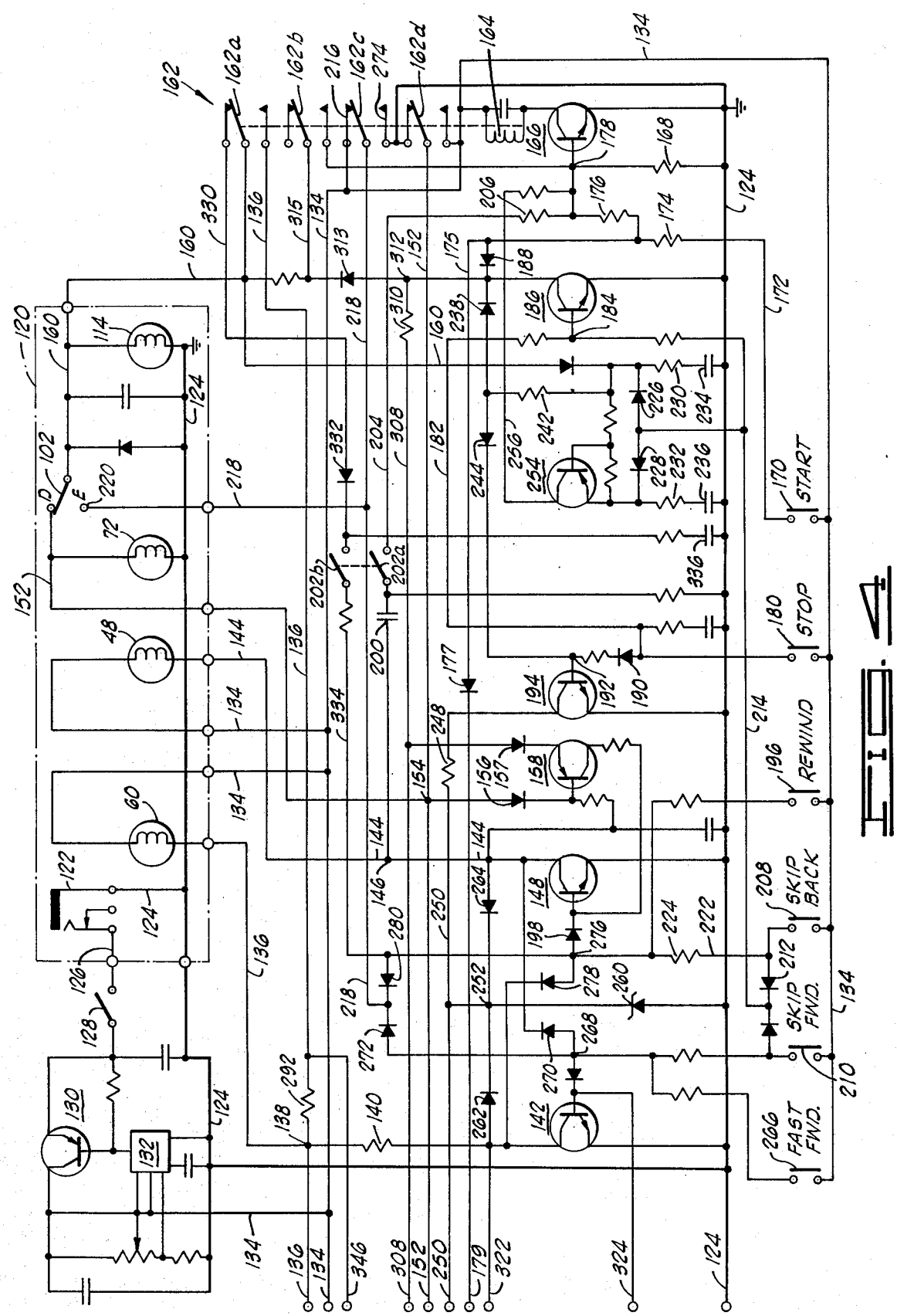

FIGS. 4 and 5, a composite of the overall circuit diagram, combine all the various automatic features attributable to the present transport control circuitry. The dash-line enclosure 120 brackets the drive motor circuitry which includes head engage motor 114, capstan drive motor 72, reverse drive motor 48 and forward motor 60. Power input to the present transport system is applied through a standard jack receptacle 122 via ground conductor 124 and a voltage supply conductor 126. A battery supply input is not optimum for any continuous or extensive usage applications, but may be suitable for short-term, intermittent operations over long periods. For general purpose usage, a power source of 7 to 7.5 volts at 500 milliamps is recommended, e.g. a commercially available power supply known as Model SPS-1185 as produced by Dormeyer Industries. D-C voltage as applied via receptacle 122 is then conducted through a power switch 128 to a voltage regulator circuit which consists of a PNP transistor 130 in series with an integrated circuit voltage regulator 132. The voltage regulator circuit 132 is a commercially available type distributed under the Model No. MPC-6033 as produced by Motorola Semi-Conductors, Inc. Thus, a plus volts D-C voltage output is provided on lead 134 for utilization throughout the transport apparatus.

The forward drive motor 60 is connected between the D-C voltage supply lead 134 and a lead 136 which is connected through a junction 138 and resistor 140 to the collector of an NPN transistor 142. The reverse drive motor 48 is connected between the plus volts D-C supply lead 134 and a lead 144 which is connected through a junction 146 to the collector of an NPN transistor 148. Capstan drive motor 72 has one side connected directly to common lead 124 while the other side is connected through a speed regulator 150 to a lead 152 which, while being connected to the "DISENGAGE" contact of microswitch 102, is also connected through a junction 154 and diode 156 to the base of a PNP transistor 158. The head engage motor 114 is connected between common lead 124 and a lead 160 leading to multi-contact head engage relay 162, as will be further described below.

The head engage relay 162, shown in de-energized position, is controlled by energization of relay coil 164 upon conduction of an NPN transistor 166. The head control transistor 166 is connected common emitter to ground lead 124 with the collector connected directly to relay coil 164, and the base of transistor 166 is connected through a resistor 168 to ground lead 124. A pushbutton START switch 170 places positive voltage from lead 134 onto lead 172 and resistors 174 and 176 to raise potential at junction 178 at the base of transistor 166 thereby to enable conduction and subsequent energization of relay coil 164 and head engage relay 162. Increased potential is also present on lead 175 through diode 177 and lead 179 to the tape motion sense circuit, (FIG. 5) as will be further described.

When head engage relay 162 is energized, the forward drive motor 60 is energized for normal play by energized closure of relay contact 162a. Thus, contact 162a closes to connect forward drive motor return lead 136 through lead 160 and ENGAGED contact 220 of microswitch 102 whereupon it finds ground through lead 218 and energized relay contact 162c.

A pushbutton STOP switch 180 may be depressed to place positive voltage from lead 134 onto a lead 182 which is connected to a base junction 184 of a common-emitter connected NPN transistor 186. Depression of the STOP pushbutton switch 180 places positive voltage at base junction 184 thereby causing conduction of transistor 186 to place the cathode of a diode 188 effectively at ground with subsequent removal of positive bias at base junction 178 of transistor 166 thereby cutting off transistor 166 and de-energizing head engage relay coil 164. STOP switch 180 also applies high voltage via diode 190 to base junction 192 causing conduction of braking transistor (NPN) 194 as will be further described.

REWIND is effected by depression of a pushbutton switch 196 which connects positive voltage lead 134 through diode 198 to the base of a common-emitter connected NPN transistor 148. The positive base voltage causes conduction of transistor 148 and effectively grounds junction 146 and lead 144 to the reverse drive motor 48 which is returned to the positive voltage lead 134. The junction 146 and lead 144 also connected through a capacitor 200 to one side of a single throw/double pole switch 202, the CONTINUOUS PLAY switch, which when closed connects via lead 204 and a resistor 206 back to the base junction 178 of the START transistor 166, as will be further discussed.

The control circuitry also utilizes a SKIP BACK and SKIP FORWARD control function by depression of respective pushbutton switches 208 and 210, each serving to enable application of the positive voltage on supply lead 134. In the SKIP BACK mode, depression of switch 208 enables positive voltage via a diode 212 and lead 214 to the base junction 184 of transistor 186 thereby rendering transistor 186 conductive to cutoff transistor 166 and de-energize head engage relay 162. De-energization of head engage relay 162 places positive supply lead 134 via relay contact 216 in conduction with lead 218 and through the engaged contact 220 (normal closed) or microswitch 102 to energize the head engage motor 114 via lead 160. Head engage motor 114 is energized for a short interval until control bar 74 (FIG. 2) is removed to its disengaged state with depression of actuator 104 of microswitch 102 to its normal open position. The rewind function is activated as transistor 148 is also energized by application of the positive potential on lead 134 via lead 222, resistor 224 and diode 198 to the base thereof, and for as long as SKIP BACK switch 208 is held depressed. The positive voltage applied on lead 214 is also conducted through each of diodes 226 and 228 through respective resistors 230 and 232 to charge capacitors 234 and 236. A diode 238 conducts through transistor 186 to ground to prevent the charge from capacitor 234 from being coupled to the braking transistor 144.

Upon release of SKIP BACK pushbutton 208, conduction ceases in transistor 186 thereby allowing the charge on capacitor 234 to conduct through resistor 230, a resistor 242 and a diode 244 to base junction 192 to drive transistor 194 into conduction thereby stopping tape reverse motion. When braking transistor 194 conducts, current flow is through a collector resistor 248 and a lead 250 reducing the potential at a junction 252 which effects braking of the drive motors, as will be further described below. Simultaneously, a PNP transistor 254 is held cutoff until capacitor 234 discharges below the value of capacitor 236 whereupon transistor 254 will then conduct via lead 256 connected to the base junction 178 of transistor 166. Conduction of transistor 254 causes conduction of transistor 166 and energization of head engage relay 162 to bring about head re-engagement and energization of forward drive motor 60 due to closure of relay contact 162a with lead 136, and connection of lead 160, terminal 220, lead 218 and relay contact 162c to ground lead 124.

Depression of the SKIP FORWARD switch 210 functions in the same manner relative to forward drive transistor 142 and the related braking transistor 194 and control transistor 166 to effect the desired function. In either case of SKIP BACK or SKIP FORWARD tape motion is stopped briefly prior to head engagement and braking transistor 194 enables precise stop control of tape motion.

The circuitry utilizes dynamic braking through energization of transistor 194 at termination of the rewind or fast forward tape motion. Thus, termination of the fast forward or rewind sequence causes a positive pulse to be coupled to the base junction 192 of braking transistor 194 which, in turn, causes current to be conducted through both motor windings of forward drive motor 60 and reverse motor 48. Thus, each of motors 60 and 48 try to move the tape but cannot because of the restraining action of the other. This results in the effect where the tape stops instantly and is held tight. Current is resistor limited, and motor torque is not sufficient to strain the tape or cause movement due to torque unbalance as between full and empty tape reels.

A zener diode 260, having breakdown voltage of 8.6 to 9.1 volts, is connected between ground lead 124 and junction point 252 and serves to shunt the braking transistor 194 for end-of-tape slow down. This is necessitated due to the fact that when one of the motors 60 or 48 is being driven, the record tape is pulling the remaining one of the motors, such that the remaining motor then acts as a generator. The voltage at diode junction 252 will then rise to several volts above the supply voltage, depending upon the speed of the motor being pulled, and when the voltage reaches the zener level, current is drawn through the pulled motor thereby slowing the tape movement. Since the motor will be pulled faster toward the end of the tape, it is forced to run slower by the zener diode 260 until it drops below the preselected zener level. The diodes 262 and 264 from junction points 252 provide current flow upon conduction of transistor 194 through the respective leads 136 or 144 to forward motor 60 and reverse motor 48, respectively.

A FAST FORWARD pushbutton switch 266 is depressed to cause conduction of forward drive transistor 142, conduction of which places lead 136 at effective ground such that the forward drive motor 60 is energized. As may be noted, FAST FORWARD switch 266 is in shunt to the SKIP FORWARD pushbutton switch 210 and functions in like manner to energize the forward drive transistor 142. Depression of FAST FORWARD switch 266 places high positive voltage at a junction point 268 such that positive voltage is conducted through a diode 270 and lead 144 to the return side of reverse drive motor 48, and the positive voltage is similarly reflected through a diode 272 and lead 218 to a relay contact 274 (when head engage relay 162 is energized) which is connected to ground lead 124. Upon depression of SKIP BACK switch 208 or RE- WIND switch 196, the opposite circuit function is achieved with positive voltage being placed at a junction 276 to energize reverse drive transistor 148 with conductive path through a diode 278 to the collector of transistor 142 and lead 136 to the return of forward drive motor 60, as well as through a diode 280 and lead 218 to the ground contact 274 of the then de-energized relay 162.

Referring now to the portion of control circuit in FIG. 5, a tape motion sense function is afforded by NPN transistors 282, 284 and 286 functioning in coaction with PNP transistors 288 and 290. The particular type of D-C motor employed as forward drive motor 60 has a three-segment armature which, when running, results in six brush crossings per revolution. The brushes lose contact briefly passing from one segment to the next with consequent change in current. The voltage pulses are developed across a resistor 292 (FIG. 4) for input via lead 136 and coupling capacitor 294 to the base of NPN transistor 282. It should be understood that the voltage spikes are present whenever the armature is turning, whether the motor is being driven or being pulled and acting as a generator, and it is these voltage spikes which are amplified and integrated to develop a D-C voltage indicative of whether or not the armature of forward drive motor 60 is turning. This D-C voltage is then used to latch in the head engage relay 162 and the head will remain engaged so long as the tape is moving unless disengaged by other ancillary control functions.

Transistor 282 functions as an amplifier of voltage pulses input through capacitor 294 and developed at the collector junction 296. The pulses are then applied to the base of transistor 284 functioning as a wave shaping circuit that further amplifies pulses for output via collector to base junction 298 of PNP transistor 288 which functions as a further wave shaping circuit providing collector output of amplified pulses. Thus, amplified positive pulses are made present at base junction 300 of NPN transistor 286 with output in the collector of amplified negative going pulses at a junction point 302. Pulses present at junction point 302 are thus integrated through storage in selected value capacitor 304 to develop a preselected threshold voltage value at base junction 306 of PNP transistor 290. As long as the integrated voltage at base junction 306 does not rise above a certain negative value relative to the D-C supply voltage on lead 134, PNP transistor 290 is conductive and providing a positive voltage indication on lead 308 which is applied back through a resistor 310 (FIG. 4) to a junction 312, diode 313 and lead 315 to relay contact 162b thereby providing a more positive latching voltage (when relay energized) at base junction 178 to maintain head engage transistor 166 conductive.

Should presence of motor motion voltage pulses on lead 136 to coupling capacitor 294 cease, or fall below a preselected average threshold, the transistor 284, 288, 286 and 290 will each become cut-off thereby to drive the output on lead 308 negative to a sufficient extent that the negative potential at base junction 178 cuts off transistor 166 to de-energize head engage relay 162 and cease functions.

Referring again to FIG. 5, a PNP transistor 314 functions to provide stop indication via panel light 316 as well as to cutoff motion sense transistor 290. Transistor 314 is non-conductive during normal play and only energized into conductivity during REWIND or FAST FORWARD. The transistor 314 is held non-conductive by positive base voltage as applied via diode 318 and lead 152 from relay contact 162d which, when energized, contacts positive voltage lead 134. When head engage relay 162 is de-energized the positive voltage is removed from lead 152 to the base of transistor 314, and during any stop or dynamic braking function, transistor 314 is cutoff by potential applied from the motor voltage junction 252 (FIG. 5) and zener diode 260 via lead 250 to the base of transistor 314. Conduction of transistor 314 then illuminates stop light 316 while also applying a cutoff potential via a diode 320 to the base junction 306 of the motion sense output transistor 290 to remove latching voltage output on lead 308.

A PNP transistor 158a merely performs latching function relative to the forward drive transistor 142 in the same manner as latching transistor 158 functions with reverse drive transistor 148. That is, when forward drive transistor 142 is conductive, the collector approaches ground potential which is coupled via lead 322 to the base of transistor 158a (FIG. 5) thereby causing conduction. Collector output from transistor 158a is then applied via lead 324 back to the base of transistor 142 (FIG. 4) to maintain the transistor base more positive and in latched conductivity. Latching of reverse drive transistor 148 is effected in like manner by transistor 158.

Referring to FIG. 5, if motor motion pulses are sensed and more positive output is present on lead 308, then voltage is conducted via diode 157a through latching transistor 158a via collector lead 324 to the base of transistor 142. A diode 156a serves to disable the latch of transistor 142 while in normal play mode by conducting potential present on lead 152, junction point 154 and capstan drive motor 72.

The control circuit is placed in the continuous play mode by closure of switch 202 and 202b and depression of start switch 170 to actuate the head engage relay 162 for initiation of normal play. Thus, with the transducer in play mode, the tape record will play through until motion sense transistor 290 (FIG. 5) ceases to respond to sufficient motion pulses, cuts off and produces more negative voltage on lead 308 through junction point 312, diode 313, lead 315 and relay contact 162b to base junction 178 of transistor 166 whereby head engage relay 162 is de-energized. Upon de-energization of relay 162, lead 160 goes to an increased voltage as received via microswitch 102 and capstan drive lead 152 which increased voltage, in turn, is present through relay contact 162a and a lead 330 through a diode 332, switch 202b, and a lead 334 to base junction 276 of reverse drive transistor 148 to effect tape REWIND. A capacitor 336 connected between ground lead 124 and switch 202b provides delayed voltage during closure of microswitch 102.

During the REWIND sequence, with transistor 148 in conduction, motion pulses are once again sensed with indicative output from transistor 290 (FIG. 5) and subsequent high voltage output on lead 308 and diode 157 to latching transistor 158 which maintains the REWIND transistor 148 in latched condition. When the tape is rewound and motion pulses cease, transistor 148 is allowed to drop out of conduction whereupon capacitor 200 discharges via lead 204 and resistor 206 from base junction 178 of transistor 166 to energize transistor 166 and re-energize head engage relay 162 with subsequent re-commencement of normal play operation of the tape record.

The complete control circuit of FIGS. 4 and 5 includes all options for control of record transducers in accordance with the present invention. This even includes an optional function enabling tape position indication. Thus, in referring to FIG. 5, a pulse output from the collector of wave shaping transistor 288 may be conducted via a capacitor 340 and resistor 342 to an output 344 which may be utilized as a count output for ancillary purposes. Similarly, voltage output from lead 136 (FIG. 4) via lead 346 may be utilized as a count direction output by differentiating the voltage value as between forward and rewind bias values. Since the motion-sense pulses are derived from the forward motor and are present whenever the motor turns in either direction, they will serve as an accurate indication of the number of revolutions of the motor, and hence the forward reel, as it is directly coupled to the motor. Therefore, if the pulses are conditioned and shaped properly, they may be counted with a digital counter and, in combination with the count direction signal, the digitized pulses may be counted up for forward reel position and down for reverse reel position with reasonable accuracy.

Figure 6:
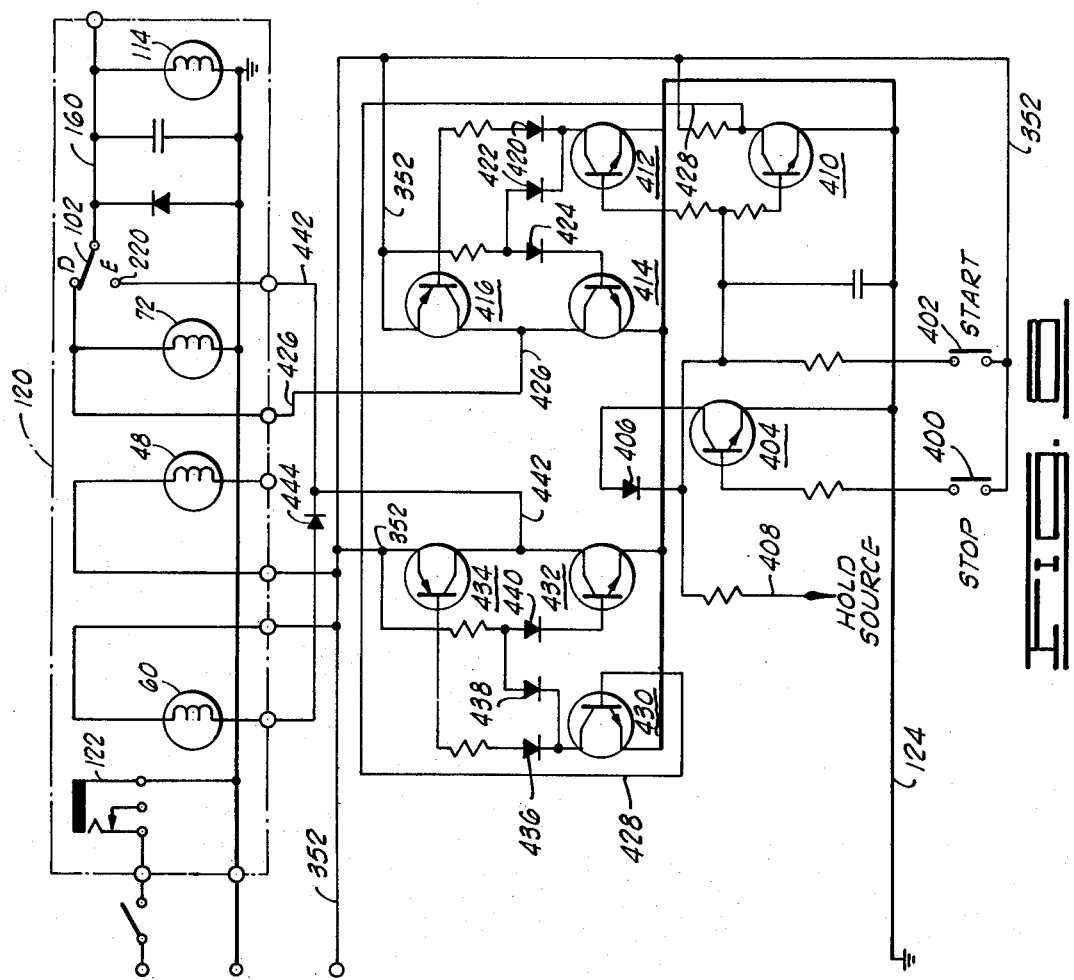
FIG. 6 is a schematic diagram of an alternative form of tape drive circuit which may be utilized in the present invention.

It should be understood that the tape transport apparatus of the present invention, as shown particularly in FIGS. 1, 2 and 3, benefits from the comprehensive control circuit of FIGS. 4 and 5, but may also be controlled in simple manner by utilization of a circuit such as that shown in FIG. 6. Positive supply voltage may be applied at voltage input jack 122 whereupon a lead 350 applies positive voltage directly to one side of forward drive motor 60 while drive power is applied to reverse drive motor 48 through mictoswitch 102, when in DISENGAGE position as shown, by way of a diode 354 and lead 356. A forward/reverse control transistor 358, type NPN, is biased for conduction at the DISENGAGE contact of microswitch 102 and, as it is connected common-emitter, the transistor 358 conducts upon depression of either of pushbutton switches 350 or 362 to effect FAST FORWARD and REVERSE reel drive, respectively. Depression of pushbutton switches 360 or 362 in the collector of transistor 358 effectively shorts the return or ground connection for respective forward drive motor 60 and reverse drive motor 48. Normal play voltage may be obtained from circuitry similar to that in FIG. 4 as applied at a lead 364 via the "ENGAGE" terminal 220 of microswitch 102 to lead 352 and input to drive motor 60. Normal play drive motor potential via lead 364 may still be controlled in the manner as set forth relative to FIG. 4 utilizing a head engage control relay 162 and attendant circuitry.

Dynamic braking is still enabled by an NPN transistor 366 connected common-emitter and having the collector connected to a diode junction 368 in series with a zener diode 370 to ground. Diodes 372 and 374 are connected from junction point 368 to each of forward and reverse drive return leads 136 and 144 and conduct alternatively, depending upon which of the pushbuttons 360 or 362 is depressed to effectively ground that respective lead. The base of transistor 366 is connected through a resistor 376 to a junction 378 between diodes 380 and 382 connected in series with respective capacitors 384 and 386 to the drive motor return leads 136 and 144. Capstan drive motor 72 may be energized directly from lead 364 when microswitch 102 is in engaged position at contact 220.

The zener diode 370 shunting braking transistor 366 will again function to effect end-of-tape slow down.

When one of motors 60 or 48 is being driven, the other motor is being pulled and acts as a generator such that the voltage at diode junction 368 will rise to several volts above the positive supply voltage, depending upon the speed of the motor being pulled, and at voltages above the zener level the current is drawn through the motor being pulled thereby slowing tape movement. Since the motor is pulled faster toward the end of the tape it is forced to run progressively slower by the zener diode until it drops below the zener level.

The circuit of FIG. 6 is not complete in itself and must be integrated with other functions of the system; however, in certain applications the simple reel drive of FIG. 6 is capable of precise control while still utilizing other options of the control circuit including tape motion sense circuitry, count functions, and continuous play. Yet a more rudimentary reel drive control for use in combination is illustrated in FIG. 7 wherein like components are similarly designated.

Figure 7:
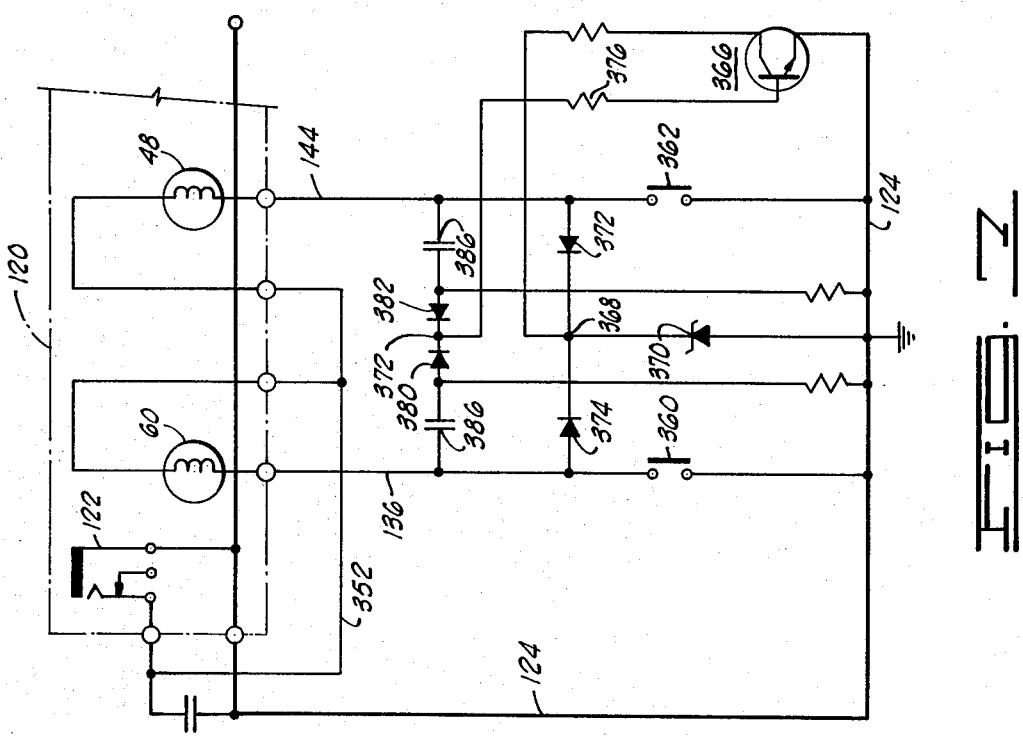
FIG. 7 is a schematic diagram of yet another alternative tape drive circuit.

The circuitry of FIG. 7 is highly similar to that of FIG. 6 except that the REWIND and FAST FORWARD controls are exercised directly with the grounding SPST normally open pushbutton switches 360 and 362. The braking transistor 366 functions in the same manner to effect dynamic braking and end-of-tape slow down. Thus, when either of pushbutton switches 360 or 362 is closed, the corresponding motor 60 or 48 runs until the switch is open. The release of the respective pushbutton switch allows a positive pulse to be coupled to the transistor base thereby to cause current to be conducted through the motor windings of motors 60 and 48. Thus, as each motor tries to move the tape but cannot because of the restraining action of the other, the tape stops instantly and is held tight.

Figures 8, 9:
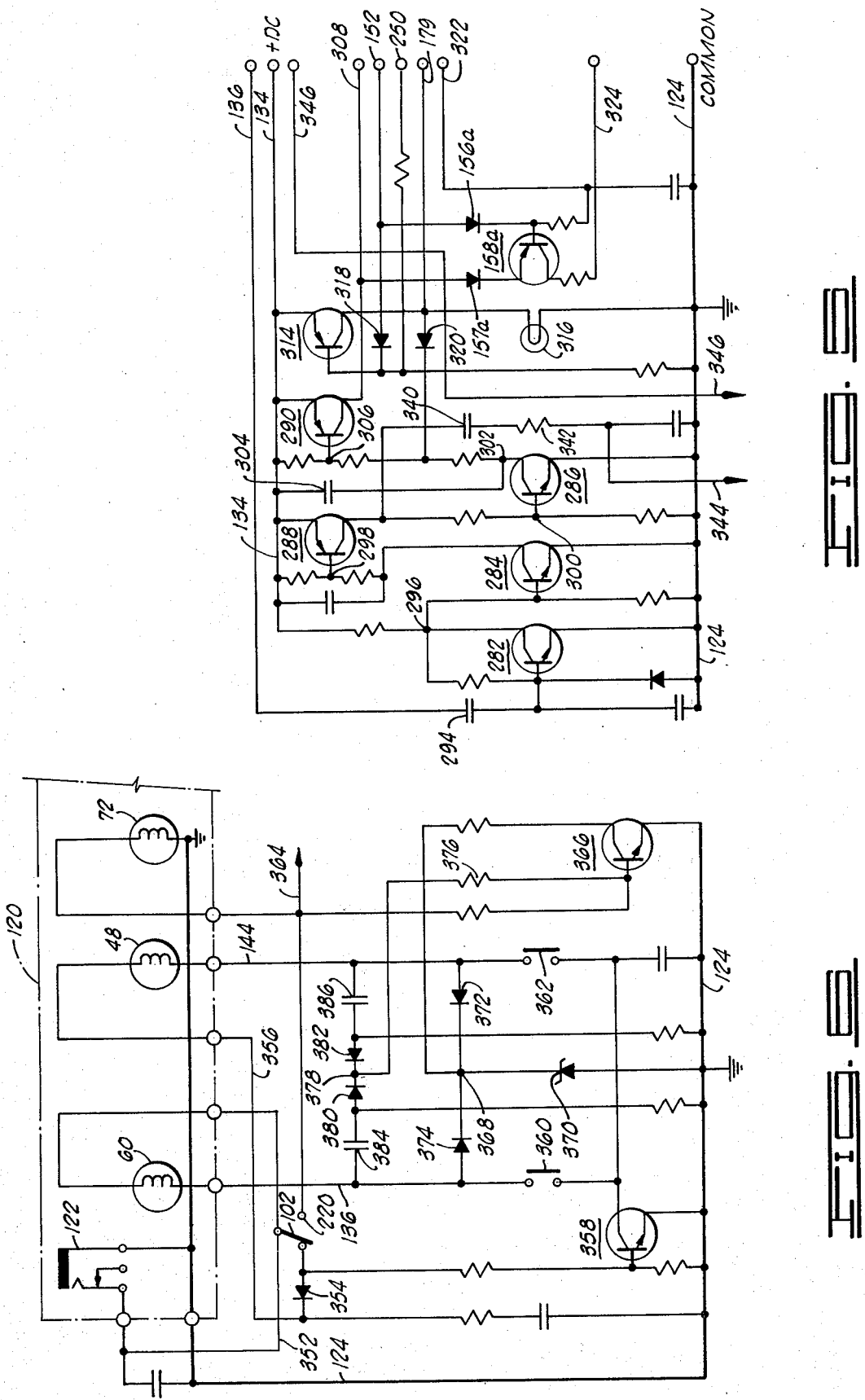
FIG. 8 is a schematic diagram of a solid state tape head position circuit which may be used in the present invention.

FIG. 8 discloses yet another option which enables head engagement control by solid state circuitry. Such option is valuable in certain applications wherein it is undesirable to have excessive relay or mechanical switching circuitry in the proximity.

In FIG. 8, positive supply voltage is supplied via lead 352 and extends to each of parallel-disposed STOP pushbutton switch 400 and START pushbutton switch 402. The stop switch 400 is connected to enable the base of an NPN transistor 404, the collector of which is connected through a diode 406 to a suitable hold source input 408, e.g. tape motion sense input as provided on latching voltage lead 308 of FIGS. 4 and 5. The start switch 402 is connected to enable the base of an NPN transistor 410 as well as the base of an NPN transistor 412. Transistor 412 is then connected for coactive input to complementary NPN transistor 414 and PNP transistor 416 as the collector of transistor 412 is connected through a diode 418 to the base of transistor 416 while being connected in parallel through a diode 422 to the emitter of transistor 416 through an additional diode 424 to the base of transistor 414. Transistors 414 and 416 are then connected common collector via lead 426 which is tied to the DISENGAGE position of microswitch 102.

The collector of transistor 410 is then connected via a lead 428 to a similar three transistor array consisting of NPN transistors 430 and 432 and PNP transistor 434. Lead 428 connects the base of transistor 430 which has the collector tied to a diode 436 to the base of transistor 434. The collector of transistor 428 is connected through another diode 438 to the emitter of transistor 434 as well as through a series-connected diode 440 to the base of transistor 432. The collectors of transistors 434 and 432 are then connected together by lead 442 which is further connected to the ENGAGE contact 220 of microswitch 102 as well as through a diode 444 in the return lead of forward drive motor 60.

In its off condition, the circuit of FIG. 8 will find transistor 410 cutoff and transistor 430 conductive since current through diode 436 maintains transistor 434 conductive as diode 438 shunts application of voltage to the base of transistor 432 maintaining it cutoff. In similar manner, transistor 412 is non-conductive maintaining transistor 414 conductive and transistor 416 not conducting.

Upon depressing the start pushbutton 402, transistor 410 is caused to conduct, cutting off transistor 430 which, in turn, cuts off transistor 434 and causes conduction of transistor 432 to provide a ground output at lead 442 through diode 444 to energize the forward drive motor 60. Simultaneously, depression of start switch 402 turns on transistor 412 causing transistor 416 to conduct while cutting off transistor 414 and placing a positive voltage on lead 426 to the DISENGAGED contact of microswitch 102 thereby to effect head engagement with subsequent flipping of microswitch 102 to the ENGAGED contact 220 after completion.

The transducer is then on and running with head engaged and such as a tape motion sense input at lead 408 (hold source) will provide automatic control of the condition. Manual control is brought about by depression of the stop switch 400 causing conduction of transistor 404 and reduced voltage value through diode 406 to the base of transistor 410, cutting off transistor 410 and causing consequent reversal of all other transistor stage conditions thereby to effect stopping of the forward drive motor 60 and energization of head engage motor 114 by means of lead 442 and contact 220 of microswitch 102 with the transducer unit coming to rest in the stop condition, and microswitch 102 in the DISENGAGED position.

The foregoing discloses novel control circuitry for tape transducing apparatus which exhibits extreme reliability and versatility of operation. The control system makes provision for precise tape movement and stopping and starting, and includes numerous desirable automatic functions such as automatic end-of-tape sensing, detection of take-up failure, instant start-stop control, "latched-in" rewind and fast forward, skip forward or skip reverse functions, continuous automatic rewind and replay, and count output for utilization in tape position readout circuitry. All functions of the tape transducing apparatus are controlled electrically such that the system lends readily to applications wherein plural transducers function in synchronous relationship or master/slave relationship, depending upon the exigencies of the applications.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A control circuit for tape transducer apparatus of the type powered by an electrical source and having a forward drive reel moving record tape past a fixed position from a reverse reel which may be selectively reverse driven, and which includes a transducer head selectively engageable in operative position at said fixed position, comprising:
   means energizable to drive said forward drive reel;
   switching means having plural inputs and actuatable to provide plural outputs including a first output to energize said means to drive and a second output latching voltage;
   reactance means for actuating said switching means when said reactance means is conductive, said reactance means receiving said second output latching voltage thereby to maintain conduction;
   circuit means connected to said means to drive said forward drive reel which generates a voltage indicative of tape motion for input to said switching means as said latching voltage; and
   second switching means actuatable to initiate conduction of said reactance means.

2. A control circuit as set forth in claim 1 which further comprises:
   suport means having said transducer head fixed thereon which is movable to place said transducer head into and out of said operative position;
   head drive means connected to impart movement to said support means when energized; and
   first means for energizing said head drive means in coincidence with initiation of conduction of said reactance means to move said transducer head into operative position.

3. A control circuit as set forth in claim 2 which further comprises:
   stop switch means actuatable to render said reactance means non-conductive thereby de-actuating said switching means and disabling said first output to the means to drive and said second output latching voltage; and
   second means for energizing said head drive means in coincidence with cessation of conduction of said reactance means to move said transducer head out of said operative position.

4. A control circuit as set forth in claim 3 wherein said first and second means for energizing comprise:
   two position switch means having a common pole and being actuatable between normal closed and normal open conductive positions when said transducer head is moved into and out of operative positions, respectively.

5. A control circuit as set forth in claim 1 which is further characterized to include:
   stop means actuatable to cease conduction of said reactance means; and
   brake transistor means which is conductive upon actuation of said stop means to effect simultaneous energization of said forward drive reel and said reverse reel thereby to effect dynamic braking of tape motion.

6. A control circuit as set forth in claim 5 wherein said stop means comprises:
   stop transistor means which when rendered conductive effectively grounds said latching voltage to cause cessation of conduction in said reactance means to de-actuate said switching means; and
   pushbutton switch means actuatable to effect conduction of said stop transistor means and said brake transistor means.

7. A control circuit as set forth in claim 1 wherein said circuit means comprises:

means coupling said means to drive said forward drive reel which generates a series of voltage pulses proportional to drive reel rotation;

wave shaping means connected to said means coupling to provide amplified voltage pulse output; and means for integrating said voltage output to generate said latching voltage for input to said switching means.

8. A control circuit as set forth in claim 4 which is further characterized to include:

stop means actuatable to cease conduction of said reactance means; and brake transistor means which is conductive upon actuation of said stop means to effect simultaneous energization of said forward drive reel and said reverse reel thereby to effect dynamic braking of tape motion.

9. A control circuit as set forth in claim 7 which is further characterized to include:

stop means actuatable to cease conduction of said reactance means; and brake transistor means which is conductive upon actuation of said stop means to effect simultaneous energization of said forward drive reel and said reverse reel thereby to effect dynamic braking of tape motion.

10. A control circuit as set forth in claim 1 which further comprises:

means energizable to drive said reverse reel;

second reactance means connected to energize said means to drive said reverse reel; and rewind switch means actuatable to control said second reactance means to energize said means to drive said reverse reel.

11. A control circuit as set forth in claim 10 which is further characterized to include:

continuous play switch means making connection between said switching means and said second reactance means to control said second reactance means to energize the means to drive said reverse reel when said switching means is de-actuated in response to said circuit means generating no voltage indicative of tape motion.

12. A control circuit for tape transducer apparatus of the type having a forward drive motor and tape reel and a reverse drive motor and tape reel coacting to move record tape past a fixed transducing position, comprising:

a D-C electrical source connected to one side of each of said forward and reverse drive motors;

first and second switching means connected to the opposite side of each of said forward and reverse drive motors which are alternately actuatable to energize said drive motors for forward and reverse tape movement, respectively; and zener rectification means connected in parallel across each of said switching means such that, when one of said drive motors is energized, the other said drive motor is being pulled to generate a D-C current and development of voltage greater than zener level to energize said other drive motor and effect end-of-tape slowdown.

13. A control circuit as set forth in claim 12 which further comprises:

transducer means and pivotal transducer support which is movable into and out of said fixed transducing position;

drive means connected to said pivotal transducer support and energizable to move said support between positions; and means energizable upon actuation of either said first or said second switching means to energize said drive means to move said transducer support out of the fixed transducing position.

* * * * *